United States Patent Office 3,470,256
Patented Sept. 30, 1969

3,470,256
FLUORINATED ETHERS
Francis W. Evans and Morton H. Litt, Morristown, N.J., assignors to Allied Chemical Corporation, New York, N.Y., a corporation of New York
No Drawing. Filed Dec. 13, 1965, Ser. No. 513,574
Int. Cl. C07c 41/04, 43/12; C09k 3/02
U.S. Cl. 260—611                           6 Claims

ABSTRACT OF THE DISCLOSURE

This invention relates to mixed ethers where one radical is a perfluorinated cyclic group and the other radical is either a halogen-substituted alkyl group or a halogen-substituted alicyclic group and contains at least one halogen other than fluorine. This invention further relates to the preparation of said ethers and to novel intermediates formed in this preparation.

---

This invention relates to a new class of fluorinated ethers and methods for their preparation and in particular relates to mixed ethers wherein one radical is a perfluorinated cyclic group and the other radical is either a halogen-substituted alkyl group or a halogen-substituted alicyclic group and contains at least one halogen other than fluorine.

This invention further relates to novel intermediates formed in the preparation of these ethers.

The fluorinated ethers of this invention are compounds of the formula

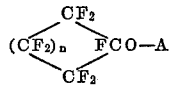

wherein $n$ is an integer of 1 to 7 and A is a member selected from the group consisting of radicals of the formulas

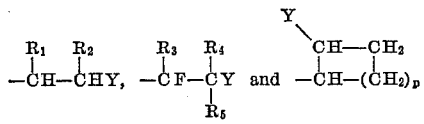

where $R_1$ and $R_2$ are independently selected from the group consisting of chlorine, hydrogen and alkyl preferably of 1 to 10 carbon atoms; Y is selected from the group consisting of chlorine, bromine and iodine; $R_3$ and $R_4$ are independently selected from the group consisting of fluorine and hydrogen, $R_5$ is selected from the group consisting of fluorine, hydrogen, chlorine, bromine, iodine, and perfluorinated alkyl preferably of 1 to 16 carbon atoms, with $R_3$ always being fluorine when both $R_4$ and $R_5$ are fluorine; and $p$ is an integer of 1 to 7.

These ethers are preferably prepared by first reacting a perfluorinated cyclic ketone with an ionizable fluoride salt to form a fluorinated organic salt and then reacting the oragnic salt with an olefin and a halogen other than fluorine (chlorine, bromine, iodine, and diatomic interhalogens thereof such as iodine monochloride) to form the desired ethers. The first reaction in which an organic salt is formed is illustrated by the following equation:

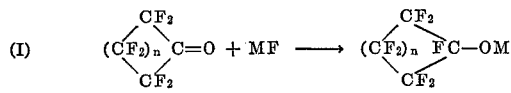

where $n$ has the meaning given above and M is a member selected from the group consisting of potassium, cesium, silver, rubidium, and tetraalkylammonium ions. These fluorinated organic salt intermediates are novel compounds.

The olefin reacted with the fluorinated organic salt in the second reaction is selected from the group consisting of compounds of the following formulas:

(1)  $R_1CH{=}CHR_2$ where $R_1$ and $R_2$ have the meanings given above;

(2)  $R_3CF{=}CR_4R_5$ where $R_3$, $R_4$ and $R_5$ have the meanings given above; and (3)  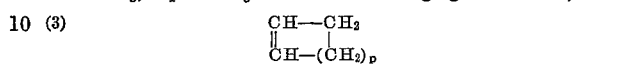

where $p$ has the meaning given above. The reactions of the above olefins and a halogen with the fluorinated organic salts are illustrated by the following equations:

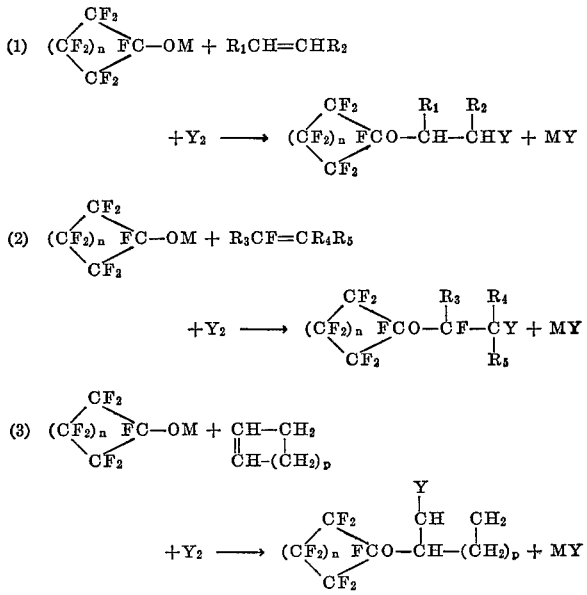

where $R_1$, $R_2$, $R_3$, $R_4$, $R_5$, Y, $p$ and $n$ have the meanings given above.

The reaction between one of the above-defined fluorinated cyclic ketones and a fluorinated compound of the formula MF to form a fluorinated organic salt can be carried out at a temperature of about −40° to 150° C. with a temperature of about 10° to 100° C. being preferred. A suitable procedure is to add the fluorinated ketone to a suspension of the MF salt in a liquid medium which is a solvent or partial solvent for the desired product. Suitable liquid media which can be used are lower alkyl nitriles such as acetonitrile, lower alkyl t-amides such as dimethyl formamide, nitrobenzene, butyrolactone, sulfolanes such as 2-methyl sulfolane, and sulfones such as methyl ethyl sulfone. Particularly outstanding results are obtained using a lower alkyl nitrile as a liquid medium.

Preferably about 0.8 to 4 mols of the fluoride reactant MF is used for each mol of fluorinated ketone. The organic salt produced is decomposed by water, and it is therefore recommended that the reaction be conducted under anhydrous conditions. Since tetraalkylammonium fluorides are somewhat unstable and difficult to handle, the tetraalkylammonium salts are preferably prepared by first making a potassium salt in accordance with Equation I and then reacting the potassium salt with either a tetraalkylammonium chloride or a tetraalkylammonium perchlorate to form the desired product and a KCl or KClO₄ precipitate.

Suitable ketones for use in the present invention include perfluorinated cyclobutanone, perfluorinated cyclopentanone, perfluorinated cyclohexanone, perfluorinated cycloheptanone, perfluorinated cyclooctanone, perfluorinated cyclononanone, and perfluorinated cyclodecanone.

The reaction between the fluorinated organic salt, an olefin and a halogen to form a fluorinated ether can be carried out at a temperature of about −40° to 150° C. with a temperature of about 10° to 100° C. being preferred. This reaction can be conveniently conducted in the same liquid medium as the first reaction, and it is unnecessary to isolate the fluorinated organic salt formed in the first reaction, but rather the olefin and halogen reactants can be added directly to the reaction mixture. The general formulas of the three groups of olefins which can be employed in the present invention are given above. Illustrative of specific olefins are $CH_2=CH_2$, $CF_2=CF_2$, $CF_2=CH_2$, $CF_2=CFCl$, $CF_2=CFBr$, $CHCl=CH_2$, $CF_2=CFCF_3$, $CH_2=CH-CH_2CH_3$, $$CH_2=CH(CH_2)_7CH_3$$

$CF_2=CFCF_2CF_3$, $CF_2=CF(CF_2)_{12}CF_3$, and

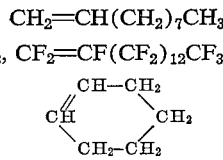

The fluorinated ethers can be separated from the other compounds present in the reaction mixture by fractional distillation. If excess iodine is present, the purification of the fluorinated ether is facilitated if the iodine is first converted to NaI by reaction with an aqueous solution of sodium sulfite prior to the fractional distillation.

In using the fluorinated ethers as intermediates, the halogen represented by the symbol Y (iodine, chlorine or bromine) can be used as a reactive site. For instance, fluorinated carboxylic acids can be produced by reacting the fluorinated ethers of this invention with a Grignard reagent to form a magnesium halide adduct, reacting this adduct with $CO_2$ to form a magnesium halide salt, and then acidifying this salt. The fluorinated carboxylic acids and the alkali metal salts thereof can lower the surface tension of water and thus are useful as surfactants.

When the fluorinated ether contains the group $-CF_2I$, an alternative method can be used to produce fluorinated carboxylic acids. The fluorinated ether can be reacted with chlorosulfonic acid to replace the iodine with a chlorosulfate group. Hydrolysis of the chlorosulfate compound with water gives the corresponding carboxylic acid, while hydrolysis with an aqueous solution of an alkali metal hydroxide gives an alkali metal salt.

Those fluorinated ethers in which Y is iodine are the most reactive and a particularly useful group of intermediates are represented by the formula

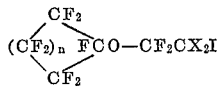

where X at each occurrence is fluorine or hydrogen and n is an integer of 1 to 7. Those fluorinated ethers where Y is chlorine or bromine possess excellent thermal stability and can be used as heat transfer media and dielectric fluids for high temperature power transformers.

Those ethers having the formulas

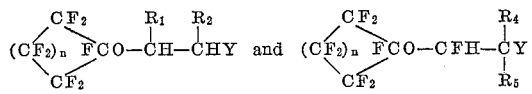

wherein n, $R_1$, $R_2$, $R_4$, $R_5$ and Y have the meanings given above, can be treated to remove hydrogen and halogen thereby forming vinyl ethers. This dehydrohalogenation can be accomplished by treatment with a strong base. In a typical procedure, 100 grams of the above ether are admixed with 80 grams of NaOH and 80 grams of soda lime and the reaction mixture is distilled, the distillate thus obtained being the desired vinyl ether.

The following examples are given to further illustrate the invention and to describe the best mode contemplated by us for carrying it out, but it is to be understood that the invention is not to be limited in any way by the details described therein.

EXAMPLE 1

Into 200 cc. of dry acetonitrile was added 0.10 mol cesium fluoride. 0.09 mol of perfluorocyclohexanone was then added with stirring giving a reaction mixture containing

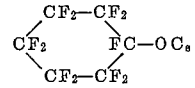

$CF_2=CH_2$ was bubbled slowly through the mixture for four hours while 0.09 mol of ICl was added dropwise. The reaction mixture was left standing overnight and then poured into cold aqueous 10% $Na_2SO_3$ solution. The organic liquid which separated on the bottom of the aqueous liquid was collected, washed three times with cold water and then distilled. A very small amount of low boiling material was collected and then 28 grams (60% yield) of the desired product perfluorocyclohexyl, 1′,1′-difluoro-2′-iodoethyl ether,

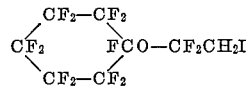

This compound had a boiling point of 67° C./20 mm. and a refractive index $n_D^{23°\,C.}=1.3566$. Elemental analysis was as follows: Calculated: C, 19.7%; H, 0.41%; I, 26.0%. Found: C, 19.4%; H, 0.48; I, 26.1%.

EXAMPLE 2

To a stirred mixture of 0.045 mol of cesium fluoride in 300 cc. of acetonitrile was added 0.045 mol of perfluorocyclopentanone. A reaction mixture was obtained which contained

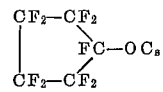

$C_2F_4$ was passed through this mixture for five hours while 0.08 mol of $Br_2$ in acetonitrile solution was added slowly. The reaction product was then poured into cold aqueous $Na_2SO_3$ solution. The organic layer which separated was collected and washed three times with cold water. The liquid remaining was distilled to give the following compounds:

| Compound | Amount | Boiling point, °C. |
|---|---|---|
| $C_2F_4Br_2$ | 0.015 mol (19% yield) | 42–46 |
| 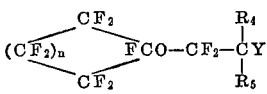 | 0.0185 mol (41% yield) | 108–109 |

The perfluoropentyl, 1′,1′,2′,2′-tetrafluoro-2′-bromoethyl ether had a refractive index $n_D^{23°\,C.}=1.3082$. Elemental analysis of this compound was as follows: Calculated: C, 19.6%; Br, 18.7%. Found: C, 19.0%; Br, 18.2%.

It will be apparent that many modifications and variations may be effected without departing from the scope of the novel concepts of the present invention, and the illustrative details disclosed are not to be construed as imposing undue limitations on the invention.

We claim:

1. A fluorinated organic ether of the formula $$(CF_2)_n \underset{CF_2}{\overset{CF_2}{\diagup\!\!\!\diagdown}} FCO-CF_2-\underset{R_5}{\overset{R_4}{\underset{|}{\overset{|}{C}}}}Y$$

wherein n is an integer of 1 to 3; $R_4$ and $R_5$ are selected from the group consisting of fluorine and hydrogen; and Y is a halogen selected from the group consisting of bromine, iodine and chlorine.

2. A fluorinated organic ether as claimed in claim 1 wherein $n$ is 2, $R_4$ and $R_5$ are fluorine and Y is bromine.

3. A fluorinated organic ether as claimed in claim 1 wherein $n$ is 3, $R_4$ and $R_5$ are hydrogen and Y is iodine.

4. A process for the preparation of a fluorinated ether of the formula

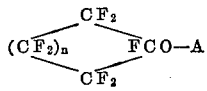

where $n$ is an integer of 1 to 3 and A is a member selected from the group consisting of radicals of the formulas

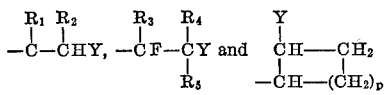

where $R_1$ and $R_2$ are independently selected from the group consisting of chlorine, hydrogen and alkyl; $R_3$ and $R_4$ are independently selected from the group consisting of fluorine and hydrogen; $R_5$ is selected from the group consisting of fluorine, hydrogen, chlorine, bromine, iodine, and perfluorinated alkyl, with $R_3$ always being fluorine when both $R_4$ and $R_5$ are fluorine; Y is selected from the group consisting of chlorine, bromine and iodine; and $p$ is an integer of 1 to 7, said process comprising reacting at a temperature of about $-40°$ to $150°$ C. a fluorinated organic salt of the formula

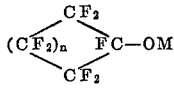

wherein $n$ has the meaning given above and M is a member selected from the group consisting of silver, potassium, rubidium, cesium, and tetraalkylammonium ions with an olefin selected from the group consisting of compounds of the formulas

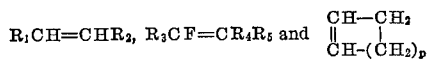

where $R_1$, $R_2$, $R_3$, $R_4$, $R_5$ and $p$ have the meanings given above, in the presence of a halogen selected from the group consisting of chlorine, bromine, iodine, and diatomic interhalogens thereof.

5. A process for the preparation of a fluorinated organic ether of the formula

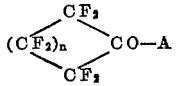

where $n$ is an integer of 1 to 3 and A is a member selected from the group consisting of radicals of the formula

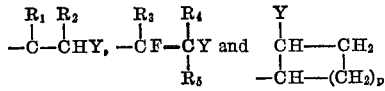

where $R_1$ and $R_2$ are independently selected from the group consisting of chlorine, hydrogen and alkyl; $R_3$ and $R_4$ are independently selected from the group consisting of fluorine and hydrogen, $R_5$ is selected from the group consisting of fluorine, hydrogen, chlorine, bromine, iodine, and perfluorinated alkyl, with $R_3$ always being fluorine when both $R_4$ and $R_5$ are fluorine; Y is selected from the group consisting of chlorine, bromine and iodine; and $p$ is an integer of 1 to 7, said process comprising reacting a ketone of the formula

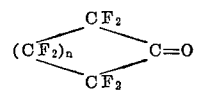

where $n$ has the meaning given above, with a fluoride compound selected from the group consisting of potassium fluoride, silver fluoride, cesium fluoride, rubidium fluoride, and tetraalkylammonium fluoride to form an organic salt, said reaction being conducted under anhydrous conditions at a temperature of about $-40°$ to $150°$ C. in a liquid medium which can dissolve at least a portion of said organic salt employing 0.8 to 4 mols of said fluoride compound per mol of said ketone; and then adding to said liquid medium containing the organic salt a halogen selected from the group consisting of chlorine, bromine, iodine, and diatomic interhalogens thereof, and an olefin selected from the group consisting of compounds of the formulas

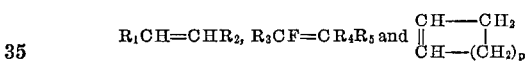

where $R_1$, $R_2$, $R_3$, $R_4$, $R_5$ and $p$ have the meanings given above while maintaining the reaction mixture at a temperature of about $-40°$ to $150°$ C.

6. A process as claimed in claim 5 wherein said liquid medium comprises a lower alkyl nitrile.

References Cited

UNITED STATES PATENTS

| | | |
|---|---|---|
| 3,382,222 | 5/1968 | Pittman et al. |
| 3,030,409 | 4/1962 | Andreades et al. |
| 3,129,248 | 4/1964 | England. |

OTHER REFERENCES

Cady: Proceedings of the Chemical Society (1960), pp. 133, 136.

BERNARD HELFIN, Primary Examiner

U.S. Cl. X.R.

252—351, 67, 65; 260—514

UNITED STATES PATENT OFFICE
CERTIFICATE OF CORRECTION

Patent No. 3,470,256      Dated September 30, 1969

Inventor(s) Francis W. Evans and Morton H. Litt

It is certified that error appears in the above-identified patent and that said Letters Patent are hereby corrected as shown below:

Column 1, lines 21-29, delete "This invention... these ethers." Column 1, line 59, "oragnic" should be --organic--. Column 3, line 66, "R," should be --$R_4$,--. Column 4, line 31, after "0.48" add --%--. Column 4, line 53, that portion of the formula reading

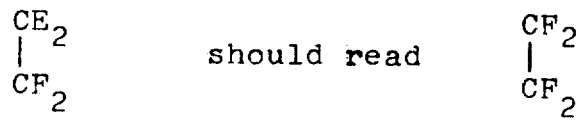

Column 5, Claim 4, line 17, that portion of the formula reading

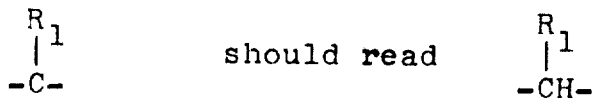

Column 5, Claim 5, line 58, that portion of the formula reading

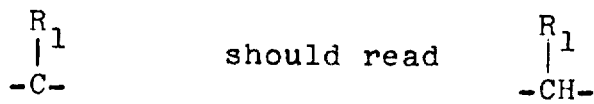

SIGNED AND SEALED
MAY 26 1970

(SEAL)
Attest:

Edward M. Fletcher, Jr.
Attesting Officer

WILLIAM E. SCHUYLER, JR.
Commissioner of Patents